(No Model.)
A. HEBERLE.
ORE PULVERIZER.
No. 269,667.  Patented Dec. 26, 1882.
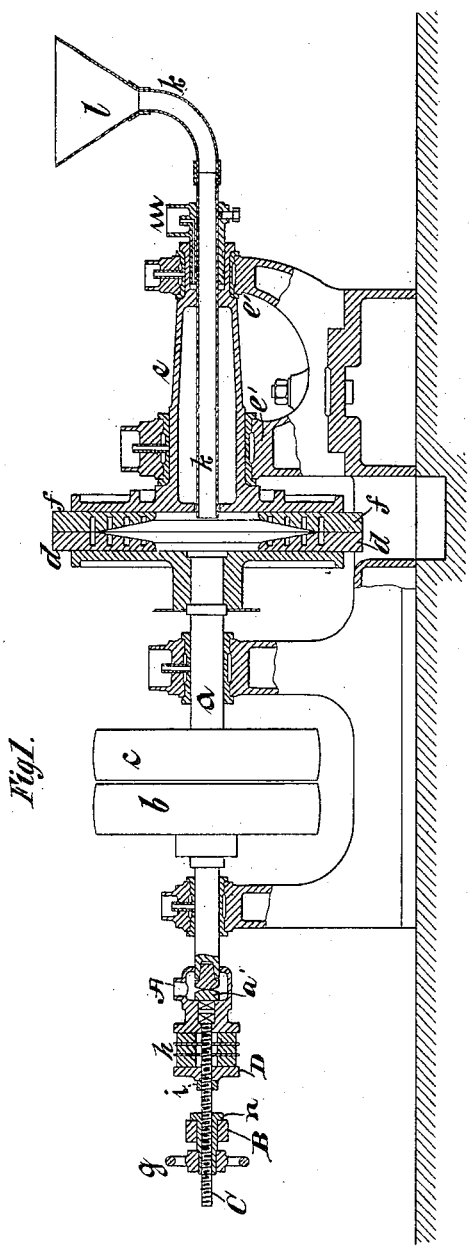
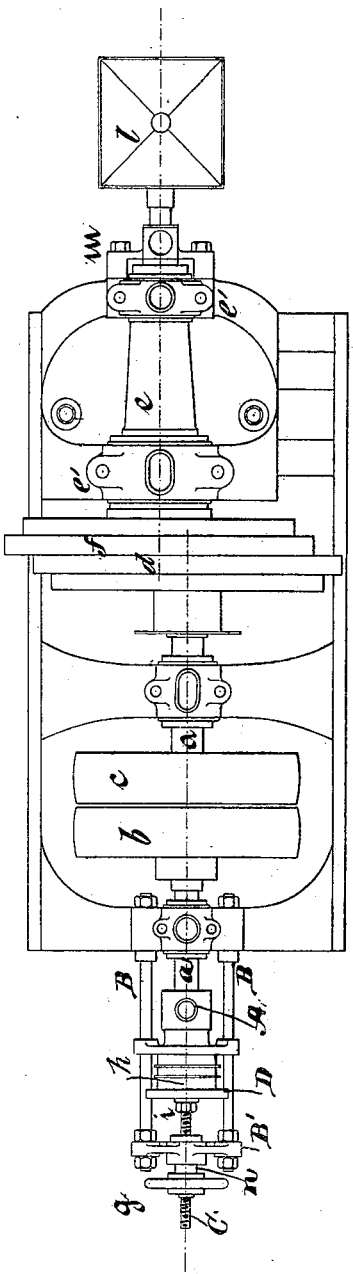
Witnesses:
Inventor:

United States Patent Office.

AUGUST HEBERLE, OF SALA, SWEDEN.

ORE-PULVERIZER.

SPECIFICATION forming part of Letters Patent No. 269,667, dated December 26, 1882.

Application filed September 9, 1882. (No model.) Patented in Germany June 27, 1879, No. 8,808, and in Austria-Hungary October 8, 1880, No. 15,814 and No. 30,037.

*To all whom it may concern:*

Be it known that I, AUGUST HEBERLE, of Sala, Sweden, a subject of the King of Sweden, and resident at Sala, in the Kingdom of Sweden, have invented new and useful Improvements in Ore-Pulverizers, of which the following is a specification.

My invention relates to that class of machines or mills in which the reduction or disintegration of material is effected by two rotary disks placed face to face, and between which the material is fed.

My invention consists in a novel combination of parts, hereinafter described, including a hollow shaft or spindle for one of the grinding-disks and a pipe arranged in said shaft or spindle, and through which ore and water may be drawn into the space between the grinding-disks by the suction produced by the rotation of said disks.

In the accompanying drawings, Figure 1 represents a longitudinal section of a machine embodying my invention, and Fig. 2 represents a plan thereof.

The same letters of reference designate corresponding parts in both figures.

$a$ designates a shaft or spindle, carrying fast and loose pulleys $b$ $c$ and the grinding-disk $d$.

$e$ designates a hollow shaft or spindle, carrying the other grinding-disk, $f$, and the shaft $e$ is supported in bearings $e'$, which may be adjusted in planes parallel with the face of the disk, so that the two disks will be more or less eccentric to each other, as may be desired.

The bearings $e'$ are formed in a frame or stock, which is secured by bolts to a foundation plate or bed, and by loosening said bolts provision is afforded for adjusting the frame or stock laterally to any extent to set the spindle $e$ eccentrically to the spindle $a$, and after it is so adjusted it may be secured by tightening said securing-bolts.

The outer end of the shaft or spindle $a$ fits in an oil-box, A, and bears against a thrust bearing or block, $a'$, therein. The oil-box A has a bearing and is adapted to slide on two rods, B, connected at their outer ends by a cross-bar, B', in which a sleeve or nut, $n$, is adapted to turn. The said sleeve or nut may be turned by a hand-wheel, $g$, applied to it.

C designates a screw, which is held by the oil-box A against rotation, but which may be moved longitudinally by turning the sleeve or nut $n$; and upon said screw is a shoulder, (here represented as formed by a nut, $i$,) which bears against a flange or abutment, D, and when the screw is moved toward the right the said flange or abutment is moved toward the oil-box A. Between the oil-box A and the flange or abutment D is a spring, $h$. (Here shown as composed of disks of rubber.) When the screw C is adjusted toward the right the spring $h$ is compressed and the grinding-disk $d$ is pressed against the disk $f$ with increased force, while when the screw is adjusted toward the left the spring is relaxed, and the pressure of the disk $d$ on the disk $f$ is decreased. A slight space is left between the thrust bearing or block $a'$ and the adjacent end of the screw C, and thus opportunity is afforded for the disk $d$ to recede from the disk $f$ if too much material or too large pieces come between the disks. As soon as material is introduced between the disks the disk $f$ will rotate by friction. Within the hollow axle $e$ is situated the stationary pipe $k$, which, together with the hopper $l$, serves to introduce the material, together with the necessary water. The gland $m$ prevents any air entering along the outside of the pipe. The rapid motion of the disks will produce a suction through the pipe $k$, and the ore and the necessary amount of water will be caused to pass through the pipe into the space between the disks by atmospheric pressure.

What I claim as my invention, and desire to secure by Letters Patent, is—

The combination, with the disk $d$ and its shaft or spindle $a$, of the disk $f$ and its hollow shaft or spindle $e$, and the pipe $k$, through which ore and water may be drawn into the space between said disks by the suction produced by the rotation of said disks, substantially as herein described.

In testimony whereof I have signed my name to this specification in the presence of two subscribing witnesses.

AUGUST HEBERLE.

Witnesses:
TH. NORDSTRÖM,
REINHOLD EKELUND.